P. BROWN & F. J. BOSTOCK.
CHUCK.
APPLICATION FILED OCT. 8, 1913.

1,100,523.

Patented June 16, 1914.

Witnesses,
W. Allen
W. E. Allen

Inventors
Percy Brown, and
Francis J. Bostock,
by Herbert W. T. Jenner.
Attorney.

UNITED STATES PATENT OFFICE.

PERCY BROWN AND FRANCIS JOHN BOSTOCK, OF HUDDERSFIELD, ENGLAND.

CHUCK.

1,100,523.   Specification of Letters Patent.   Patented June 16, 1914.

Application filed October 8, 1913. Serial No. 794,045.

*To all whom it may concern:*

Be it known that we, PERCY BROWN and FRANCIS JOHN BOSTOCK, subjects of King George V of Great Britain, residing at Huddersfield, in the county of York, England, have invented certain new and useful Improvements in Chucks, of which the following is a specification.

This invention has reference to chucks or work holders of the type wherein a contractible collet is forced by the endwise movement of a hollow sleeve against a conical surface which causes the collet to center and grip the work spindle or other part, and the object of the invention is to provide an improved construction of chuck by means of which the work spindle can be accurately and quickly gripped in a most efficient manner, and as quickly released.

Our invention consists in so constructing a chuck of this type that the gripping of the work holder or other part is effected, as it were, in two stages, that is to say, a preliminary grip is first obtained, and afterward, by the operation of additional mechanism, the collet is caused to grip the work spindle or other part very powerfully.

The invention will be described with reference to the accompanying drawing in which:—

Figure 1:
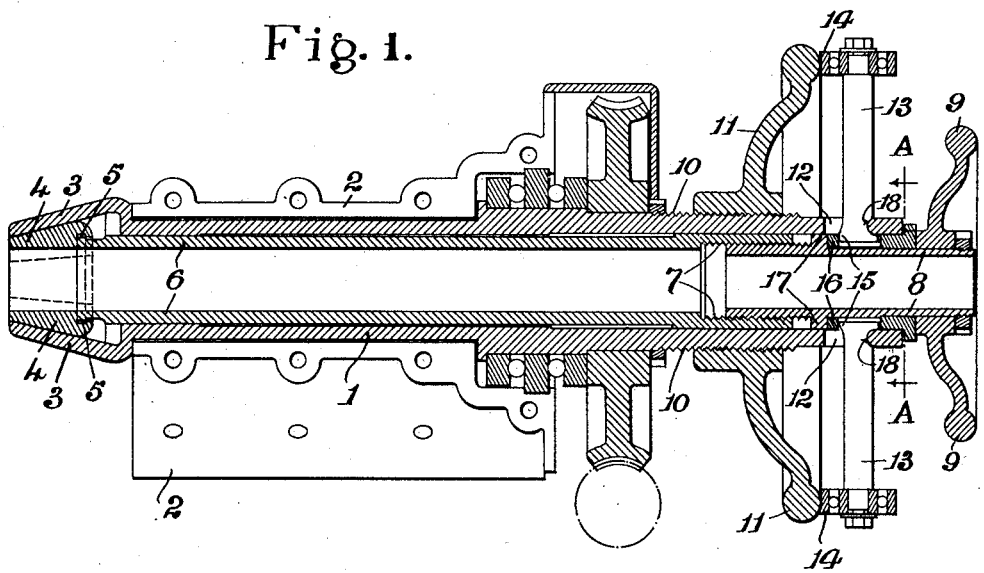
Figure 2:
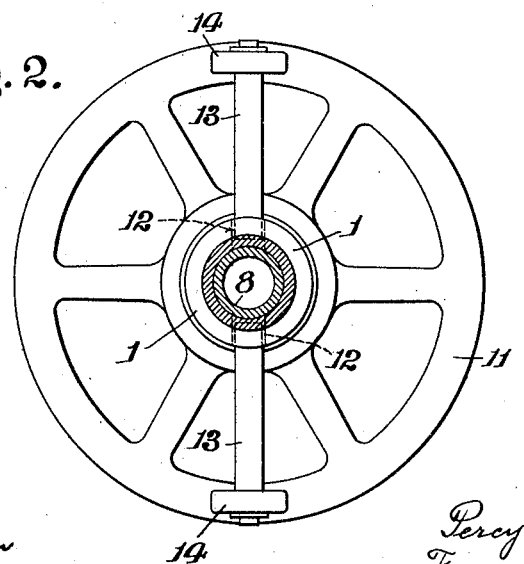

Figure 1 is a longitudinal section of a collet chuck embodying the improvements; Fig. 2 being a section on the line A—A Fig. 1.

Referring to the drawing, 1 represents a hollow chuck spindle revolubly supported in a suitable housing or bracket 2 adapted to be secured to the work table of the machine. One end of the hollow spindle 1 is provided, as usual, with a conical head 3 within which are placed a collet or series of collet segments 4 having their inner faces parallel to the longitudinal axis of the chuck and their outer faces inclined to correspond with the inclination of the interior surface of the head 3. The inner end or ends of the collet or collets is or are grooved or recessed annularly, and into the groove thus formed fits an annular flange 5 on one end of a hollow sleeve 6 adapted to fit and to be slid longitudinally within the hollow spindle 1. The movement of the sleeve 6 within the spindle 1 toward the head 3 causes the collet or collets to be pressed against the internally coned surface of the said head and thus to close and grip a work spindle or other article inserted in the chuck, and movement of said sleeve in the reverse direction causes the pressure of the collet or collets on the work spindle or other article to be removed.

It is to the means for imparting longitudinal movement to the sleeve 6 that our invention relates, and the improvements will now be described.

According to our invention, the end of the sleeve 6 opposite to that engaging the collet or collets is screwed internally as at 7, and into this screwed portion fits a sleeve 8 having fast thereon a hand wheel 9. The end of the spindle 1 opposite to that at which the head 3 is formed, is provided with an externally screwed portion 10, on which works a hand wheel 11, and with two slots 12, 12, through which extend the inner ends of respective levers 13, 13. Each of these levers is provided at its outer end with a freely revoluble runner or bearing ring 14 adapted to engage and bear against the face of the rim of the hand wheel 11, and the inner ends 15, 15, of the levers are adapted to engage and bear against a ring 16 which rests against a shoulder 17 on the adjusting sleeve 8. Rounded surfaces 18, 18, at the outer ends of the slots 12, 12, form pivots for the levers 13, 13.

Rotation of the hand wheel 9, in a direction to withdraw the sleeve 8 from the sleeve 6, causes the ring 16 to bear against the ends 15, 15, of the levers 13, 13, the outer ends of which are thus pressed against the rim of the wheel 11. The sleeve 8 being thus prevented from moving outward, a longitudinal movement is given to the sleeve 6 and the collet or collets is or are pressed inward to partially grip a work spindle or other article inserted into the bore of the sleeve 6. When the work spindle or the like has been thus inserted and partially gripped, the hand wheel 11 is rotated in a direction to cause it to move outwardly on the screwed portion 10 of the spindle 1. The levers 13, 13, are thus caused to rock in their pivots 18, 18, and their inner ends 15, 15, press upon the ring 16 and consequently tend to slide the sleeve 8 and the sleeve 6 forwardly. By reason of the great leverage obtained by the levers 13, 13, the collets are caused to take a very powerful grip on the positioned and already partially gripped work spindle. To release the work spindle, the hand wheel 11 is first rotated to take off the pressure of the levers 13, 13, and the hand wheel 9 afterward operated to cause the sleeve 8 to draw the sleeve 6 inward and thus withdraw the collet or collet segments from engagement with the coned interior of the head 3.

Having thus described our invention, what we claim as new and desire to secure by Letters Patent is:—

1. In a chuck, the combination, with a non-slidable outer sleeve provided with a chuck member, and an inner sleeve slidable longitudinally in the outer sleeve and provided with a contractible chuck member; of a revoluble wheel screwthreaded to move longitudinally on the outer sleeve, levers pivoted to the outer sleeve with their outer end portions engaging with the said wheel, and a revoluble adjusting member engaging with the inner end portions of the said levers and provided with a screwthreaded portion which engages with the inner sleeve.

2. In a chuck, the combination, with a non-slidable outer sleeve provided with a chuck member, and an inner sleeve provided with a contractible chuck member; of a revoluble wheel screwthreaded to move longitudinally on the outer sleeve, levers pivoted to the outer sleeve with their outer end portions engaging with the said wheel, a revoluble adjusting member provided with an external shoulder and having a screwthreaded portion which engages with the inner sleeve, and a ring interposed between the said shoulder and the inner end portions of the said levers.

3. In a chuck, the combination with a hollow spindle having a conical head, a collet or collets within and coöperating with said head, and a hollow sleeve slidable within the hollow spindle and controlling the longitudinal position of the collet within the head, of an internally screwed portion on the said hollow sleeve, an externally screwed sleeve engaging in the said internally screwed portion of the hollow sleeve, a series of levers passing through slots in the hollow spindle said slots having rounded surfaces at their ends to form pivots for the levers, a shoulder on the adjusting sleeve against which the inner ends of the levers are adapted to bear either directly or through a ring placed against said shoulder, and a hand wheel working on an externally screwed part of the hollow spindle, and adapted to engage revoluble bearing rings on the outer ends of the levers, all substantially as herein shown and set forth.

In testimony whereof we affix our signatures in the presence of two witnesses.

PERCY BROWN.
FRANCIS JOHN BOSTOCK.

Witnesses:
  T. E. WHITELEY,
  C. E. HINCHLIFF.

---

Copies of this patent may be obtained for five cents each, by addressing the "Commissioner of Patents, Washington, D. C."